(12) United States Patent
Hamm et al.

(10) Patent No.: US 12,473,987 B2
(45) Date of Patent: Nov. 18, 2025

(54) LOW-PROFILE PAIRED RELIEF VALVE

(71) Applicant: Engineered Controls International, LLC, Elon, NC (US)

(72) Inventors: Mark Kendrick Hamm, Cullman, AL (US); Christopher Taylor Herman, Greensboro, NC (US)

(73) Assignee: Engineered Controls International, LLC, Elon, NC (US)

( * ) Notice: Subject to any disclaimer, the term of this patent is extended or adjusted under 35 U.S.C. 154(b) by 187 days.

(21) Appl. No.: 17/662,490

(22) Filed: May 9, 2022

(65) Prior Publication Data

US 2022/0260167 A1 Aug. 18, 2022

Related U.S. Application Data

(63) Continuation of application No. 16/266,295, filed on Feb. 4, 2019, now Pat. No. 11,346,454.

(60) Provisional application No. 62/627,280, filed on Feb. 7, 2018.

(51) Int. Cl.
*F16K 17/10* (2006.01)
*F16K 17/04* (2006.01)
*F16K 27/00* (2006.01)

(52) U.S. Cl.
CPC .............. *F16K 17/10* (2013.01); *F16K 17/04* (2013.01); *F16K 27/003* (2013.01)

(58) Field of Classification Search
CPC ...... F16K 17/10; F16K 17/048; F16K 27/003; F16K 15/025; F16K 15/066; Y10T 137/86759; Y10T 137/86726; Y10T 137/87265
See application file for complete search history.

(56) References Cited

U.S. PATENT DOCUMENTS

| | | | |
|---|---|---|---|
| 2,804,317 | A | 8/1957 | Prater |
| 3,087,510 | A | 4/1963 | Normand, Jr. |
| 3,457,949 | A | 7/1969 | Coulter |
| 3,807,687 | A | 4/1974 | Thompson |
| 2017/0343161 | A1 | 11/2017 | Byggmastar et al. |

FOREIGN PATENT DOCUMENTS

| | | |
|---|---|---|
| CN | 103742689 | 4/2014 |
| WO | WO2016042201 | 3/2016 |
| WO | WO2016135372 | 9/2016 |

OTHER PUBLICATIONS

International Search Report and Written Opinion for PCT/US2019/016493 dated Jul. 23, 2019, 11 pp.

*Primary Examiner* — Kenneth Rinehart
*Assistant Examiner* — Nicole Gardner
(74) *Attorney, Agent, or Firm* — Neal, Gerber & Eisenberg LLP

(57) ABSTRACT

A pressure relief valve assembly is disclosed. The pressure relief valve assembly comprises an inlet manifold, a first pressure relief valve, a second pressure relief valve, and an outlet manifold. The first pressure relief valve is connected to and in fluid communication with the inlet manifold. The second pressure relief valve is connected to and in fluid communication with the inlet manifold and parallel to the first pressure relief valve. The outlet manifold is connected to and in fluid communication with the first pressure relief valve and the second pressure relief valve.

20 Claims, 7 Drawing Sheets

LOW-PROFILE PAIRED RELIEF VALVE

CROSS-REFERENCE

This application is a continuation of U.S. patent application Ser. No. 16/266,295, filed on Feb. 4, 2019, which claims the benefit of U.S. Provisional Patent Application No. 62/627,280, filed on Feb. 7, 2018, both of which are hereby incorporated by reference in their entireties.

TECHNICAL FIELD

The present disclosure generally relates to valves for conveying fluids such as cryogenic fluids and, more specifically, to a low-profile paired relief valve.

BACKGROUND

Cryogenic fluid is often stored in a pressurized tank. Pressure in the tank may fluctuate due to temperature variations, filling of the tank, or dispensing of fluid from the tank. The tank may include one or more valves to exhaust fluid from the tank to relieve pressure in the tank.

SUMMARY

This application is defined by the appended claims. The description summarizes aspects of exemplary embodiments and should not be used to limit the claims. Other implementations are contemplated in accordance with the techniques described herein, as will be apparent upon examination of the following drawings and detailed description, and such implementations are intended to be within the scope of this application.

In an embodiment, a pressure relief valve assembly disclosed herein comprises an inlet manifold, a first pressure relief valve, a second pressure relief valve, and an outlet manifold. The first pressure relief valve is connected to and in fluid communication with the inlet manifold. The second pressure relief valve is connected to and in fluid communication with the inlet manifold and parallel to the first pressure relief valve. The outlet manifold is connected to and in fluid communication with the first pressure relief valve and the second pressure relief valve.

In another embodiment, a pressure relief valve assembly disclosed herein comprises an inlet manifold, parallel first and second pressure relief valves, first and second adapters, and an outlet manifold. The inlet manifold has a first annular wall defining a first internal passage and first and second outlet ports. The first and second outlet ports are parallel and extending through the annular wall. The parallel first and second pressure relief valves are respectively threadably engaged with the first and second outlet ports. The first and second adapters are respectively threadably engaged with the first and second pressure relief valves. The first and second adapters respectively define first and second fluid passages. The outlet manifold includes a second annular wall defining a second internal passage and first and second inlet ports. The first and second inlet ports respectively receivingly engage the first and second adapters.

In a further embodiment, a pressure relief valve assembly disclosed herein comprises an inlet manifold, first and second parallel pressure relief valves, first and second union nuts, and an outlet manifold. The first and second parallel pressure relief valves are connected to the inlet manifold. The first and second union nuts are respectively captured on the first and second pressure relief valves. The outlet manifold is threadably engaged with the first and second union nuts to sealingly engage with and retain the first and second pressure relief valves.

DETAILED DESCRIPTION

Figure 1:
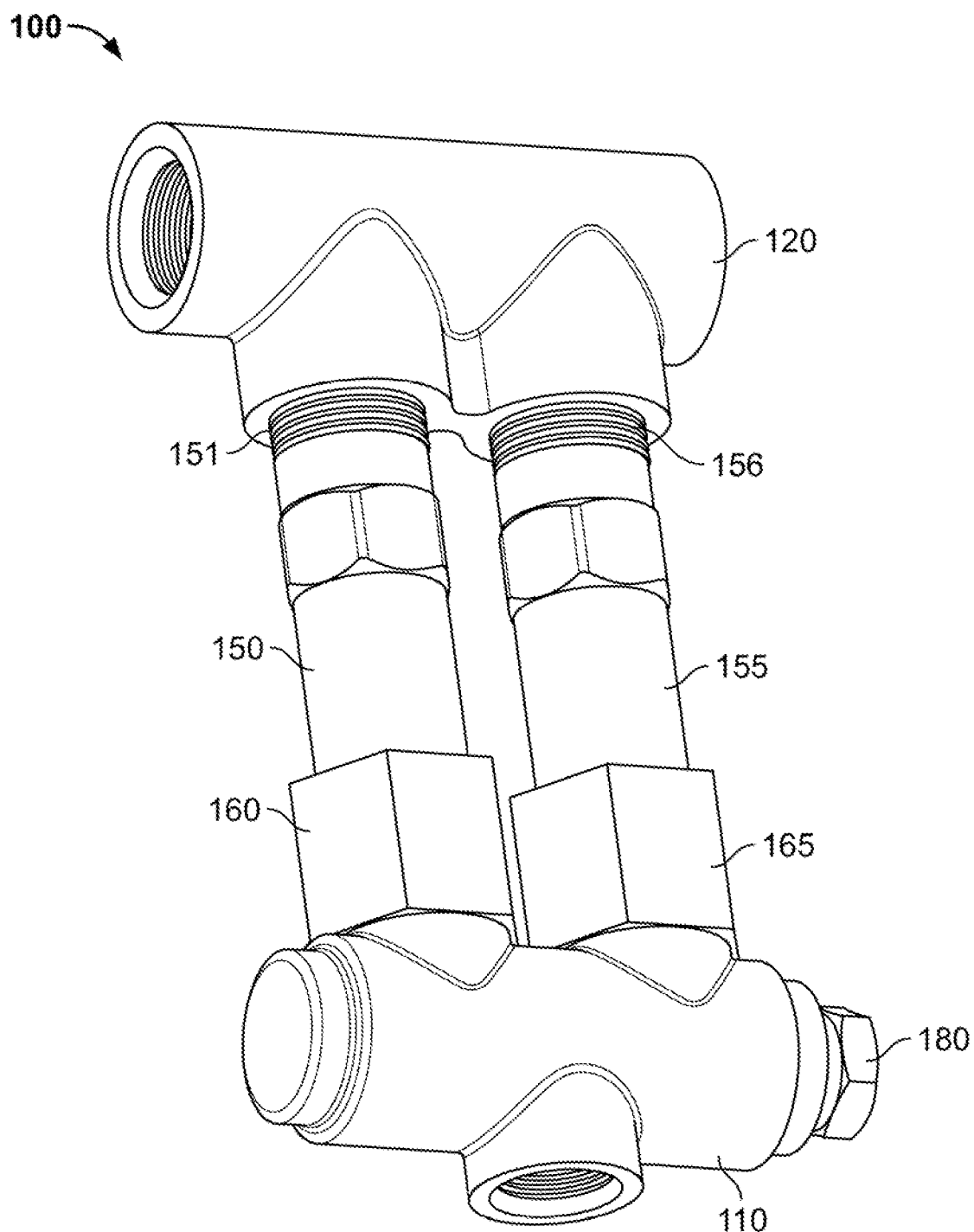
FIG. 1 is a perspective view of a low-profile paired relief valve assembly.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents. The specification describes exemplary embodiments which are not intended to limit the claims or the claimed inventions. Features described in the specification, but not recited in the claims, are not intended to limit the claims.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. Further, each of the drawings may be drawn to a different scale (e.g., the scale of FIG. 1 may be different than the scale of FIG. 5B).

Some features may be described using relative terms such as top, bottom, vertical, rightward, leftward, etc. It should be appreciated that such relative terms are only for reference with respect to the appended drawings. These relative terms are not meant to limit the disclosed embodiments. More specifically, it is contemplated that the valve assembly depicted in the appended drawings will be oriented in various directions in practice and that the relative orientation of features will change accordingly.

As stated above, the present specification is intended to be taken as a whole and interpreted in accordance with the principles of the present invention as taught herein and understood by one of ordinary skill in the art.

Figure 2:
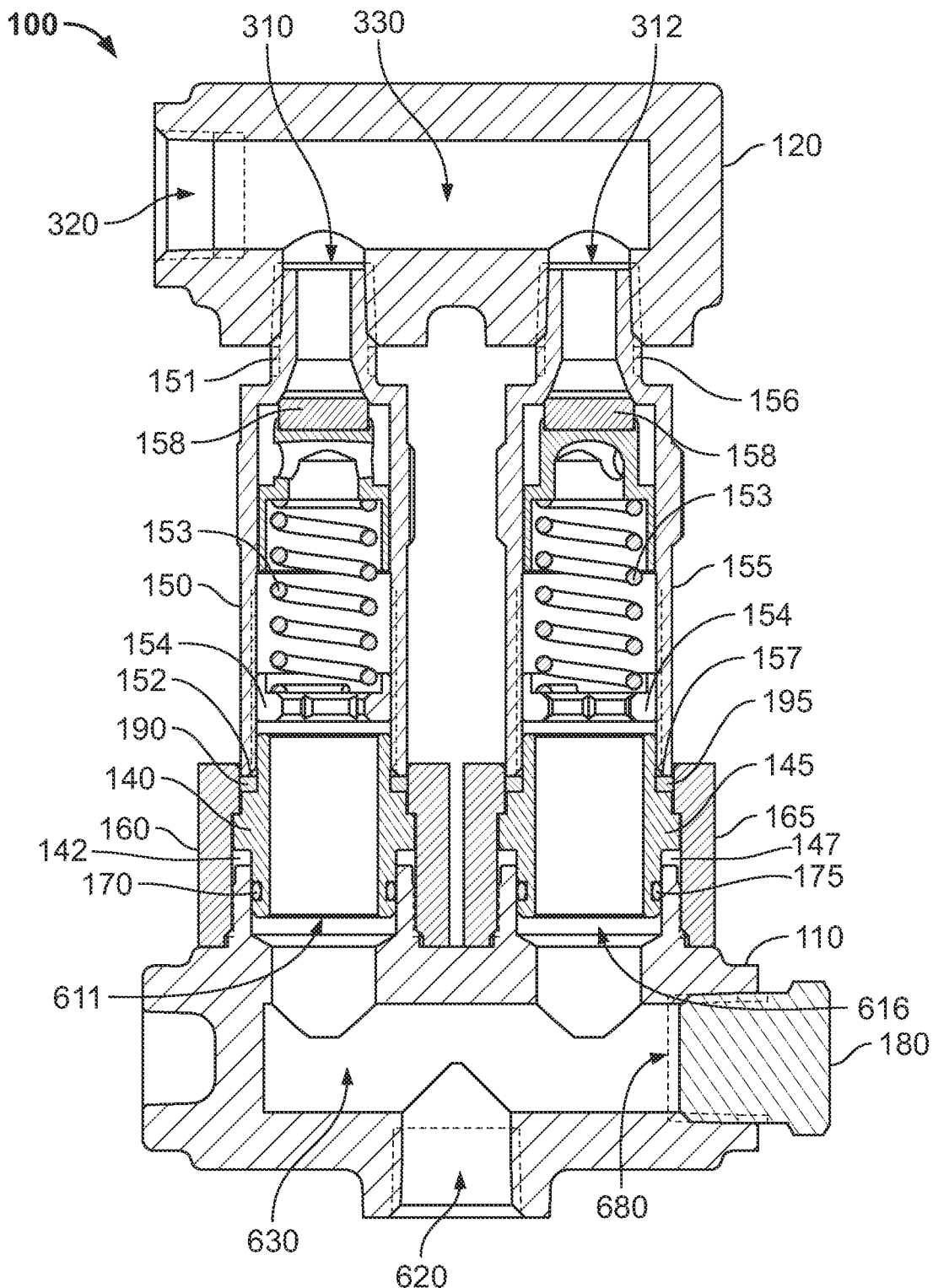
FIG. 2 is cross-sectional view of the valve assembly of FIG. 1.

FIGS. 1 to 6 illustrate exemplary structural features of a low-profile paired relief valve assembly 100. FIG. 1 is a perspective view of the low-profile paired relief valve assembly 100. FIG. 2 is a cross-sectional view of valve assembly 100. Valve assembly 100 includes an outlet manifold 110, an inlet manifold 120, a first adapter 140, a second adapter 145, a first pressure relief valve (PRV) 150, a second PRV 155, a first union nut 160, a second union nut 165, a first O-ring 170, a second O-ring 175, a plug 180, a third O-ring 190, and a fourth O-ring 195.

As shown in FIGS. 1 and 2, the first PRV 150 has a first inlet end 151 and a first outlet end 152, and second PRV 155 has a second inlet end 156 and second outlet end 157. Further, each of the first and second PRVs 150, 155 include a spring 153, an externally threaded adjustment screw 154, and a valve seat 158. The springs 153 are supported by the adjustment screws 154 to urge the valve seats 158 into a closed position and seal the first and second PRVs 150, 155. The first inlet end 151 and the second inlet end 156 are externally threaded to threadably engage with inlet manifold 120. When the first and second PRVs 150, 155 are threadably engaged with inlet manifold 120, the first and second PRVs 150, 155 are substantially parallel, as will be explained in further detail in conjunction with FIG. 3. In other words, the first and second PRVs 150, 155 are next to one another and extend radially away from the inlet manifold 120. First and second PRVs 150, 155 are thus coplanar and extend away from inlet manifold 120 in the same direction, substantially perpendicular to a central axis 331. First outlet end 152 is internally threaded to engage with the first adapter 140, and second outlet end 157 is internally threaded to engage with the second adapter 145, as shown in FIG. 2.

Figure 5A:
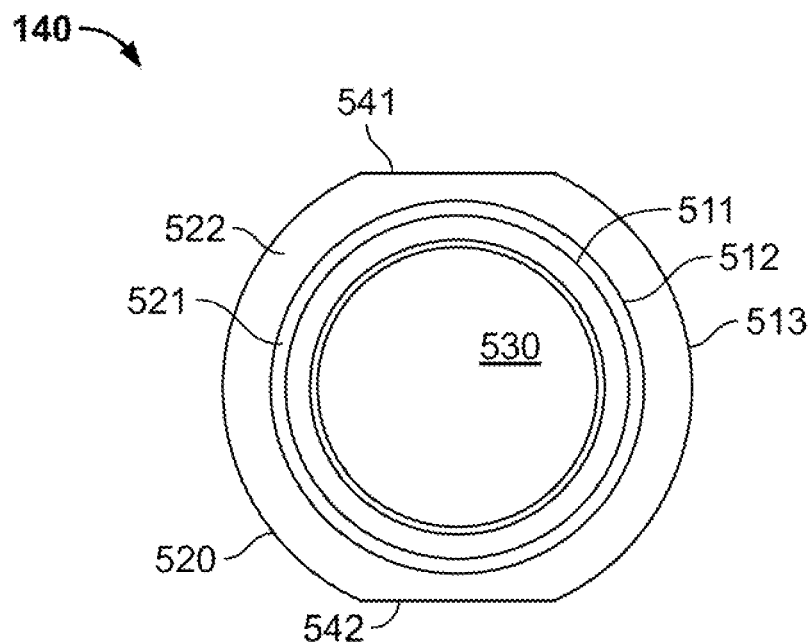
FIG. 5A is a top view of an adapter of the valve assembly of FIG. 1
Figure 5B:
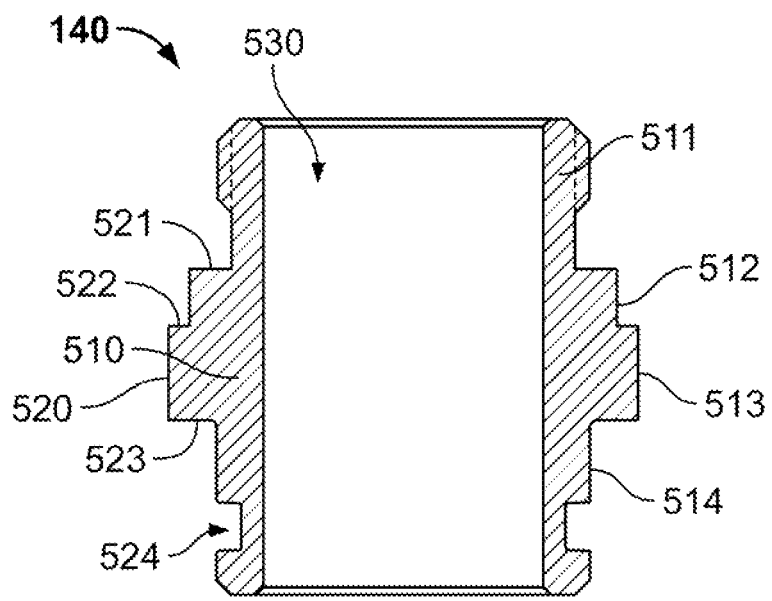
FIG. 5B is a cross-sectional view of the adapter of FIG. 5A.

In the example of FIG. 2, the third O-ring 190 is disposed about first adapter 140, and compressed between first outlet end 152 of first PRV 150 and first adapter 140, as will be further explained in conjunction with FIG. 5B. Additionally, fourth O-ring 195 is disposed about the second adapter 145 and compressed between second outlet end 157 of second PRV 155 and second adapter 145. It should be understood that as the first and second adapters 140, 145 are respectively threaded into the first and second PRVs 150, 155, respective compression of the third and fourth O-rings 190, 195 increases and vice-versa. The compressed third and fourth O-rings 190, 195 substantially prevent fluid leaks respectively between the first and second PRVs 150, 155 and the first and second adapters 140, 145.

In the illustrated example of FIG. 2, first O-ring 170 is disposed about first adapter 140 and second O-ring 175 is disposed about second adapter 145. First and second adapters 140, 145 are inserted into the outlet manifold 110, as will be further explained in conjunction with FIGS. 5B and 6. Thus, first O-ring 170 is compressed between first adapter 140 and outlet manifold 110 and second O-ring 175 is compressed between second adapter 145 and outlet manifold 110, and the first and second adapters 140, 145 are thereby sealingly engaged with outlet manifold 110.

The first and second union nuts 160, 165 respectively engage the first and second adapters 140, 145. It should be understood that first adapter 140 retains first union nut 160 in sliding and rotating engagement with first PRV 150 while second adapter 145 retains second union nut 165 in sliding and rotating engagement with second PRV 155. The first union nut 160 is free to rotate about the first PRV 150 and relative to the first adapter 140 and second union nut 165 is free to rotate about the second PRV 155 and relative to the second adapter 145. In other words, the first and second union nuts 160, 165 are free to respectively slide along the outside of the first and second PRVs 150, 155, but are respectively captured on first and second PRVs 150, 155 by first and second adapters 140, 145, as will be further explained in conjunction with FIGS. 4B and 5B.

Figure 4A:
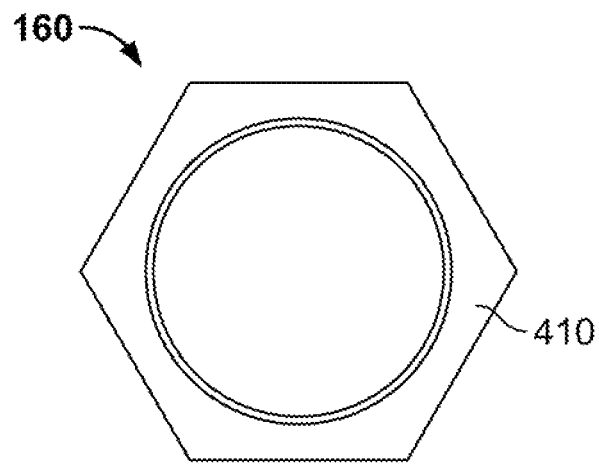
FIG. 4A is a top view of a union nut of the valve assembly of FIG. 1.
Figure 4B:
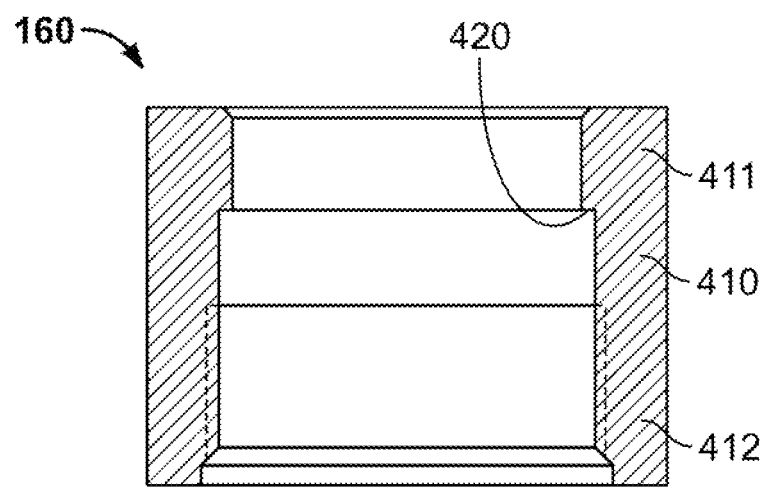
FIG. 4B is a cross-sectional view the union nut of FIG. 4A.
Figure 6:
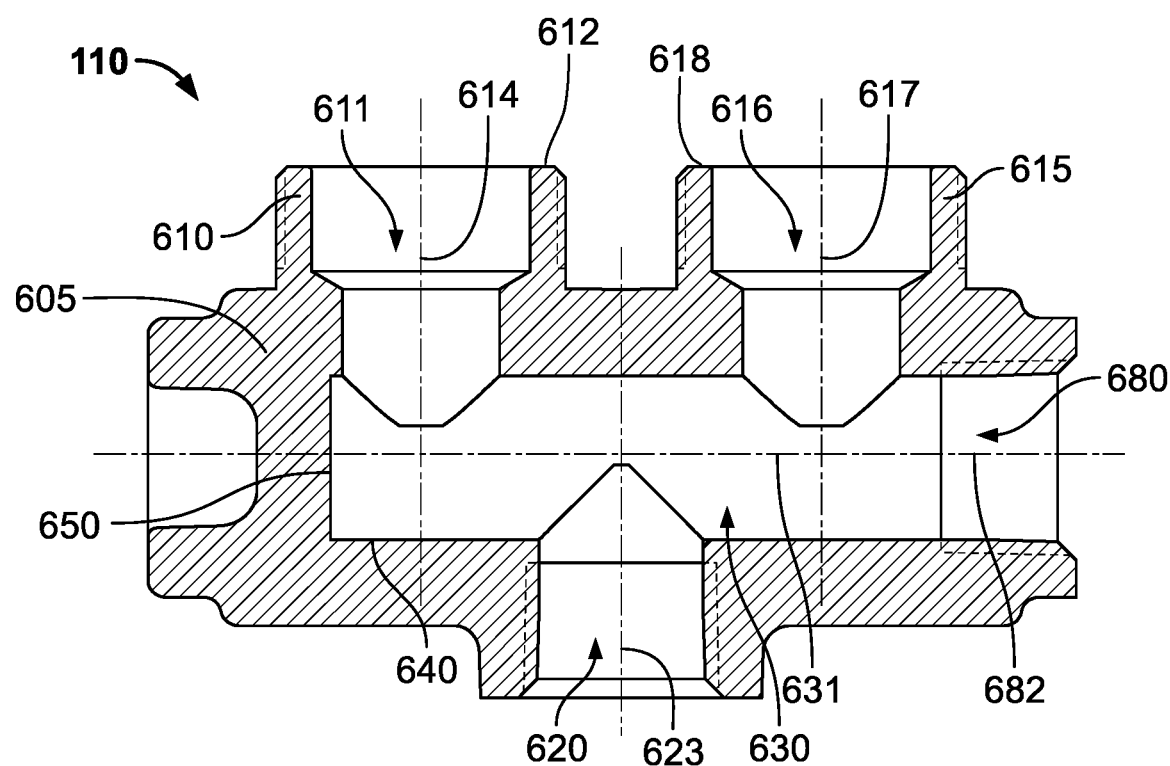
FIG. 6 is a cross sectional view of an outlet manifold of the valve assembly of FIG. 1.

Further, as shown in the illustrated examples of FIGS. 1 and 2, the first and second union nuts 160, 165 are internally threaded to threadably engage with the outlet manifold, as will be further explained in FIGS. 4B and 6. It should be understood, that as the first union nut 160 is tightened onto the outlet manifold 110, the first adapter 140 and first O-ring 170 are inserted into the outlet manifold 110 to sealingly engage the first adapter 140 with the outlet manifold 110. Similarly, as the second union nut 165 is tightened onto the outlet manifold 110, the second adapter 145 and second O-ring 175 are inserted into the outlet manifold 110 to sealingly engage the second adapter 145 with the outlet manifold 110. In other words, as the first and second union nuts 160, 165 are threaded onto the outlet manifold 110, the first and second union nuts 160, 165 respectively engage with the first and second adapters 140, 145 to respectively push first and second adapters 140, 145 and first and second O-rings 170, 175 into outlet manifold 110.

The plug 180 is externally threaded to threadably engage with outlet manifold 110. The plug 180 may seal an opening of outlet manifold 110, as will be explained in further detail in conjunction with FIG. 6.

Figure 3:
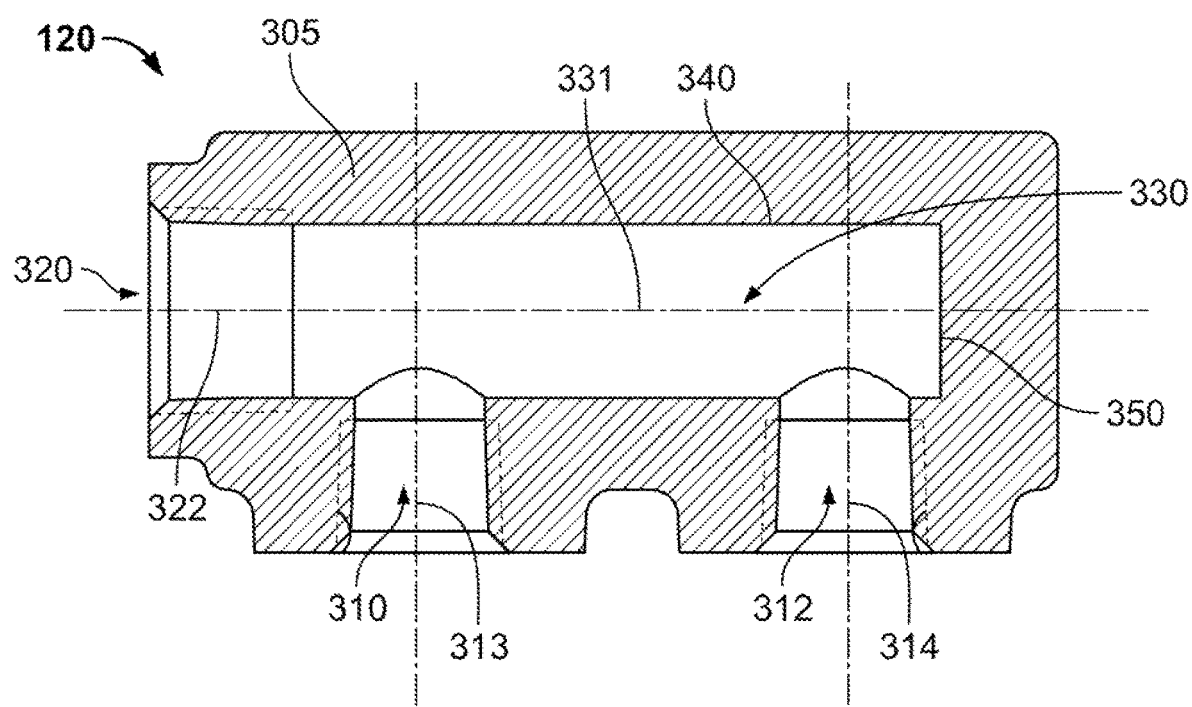
FIG. 3 is a cross-sectional view of an inlet manifold of the valve assembly of FIG. 1.

As shown in the cross-sectional view of FIG. 3, inlet manifold 120 includes a body 305 defining a first outlet port 310, a second outlet port 312, an inlet port 320, and an internal passage 330. More specifically, the body 305 includes an internal annular wall 340 and an end wall 350. The annular wall 340 is generally cylindrical and is integrally connected to the end wall 350 to define internal passage 330. Internal passage 330 has a first central axis 331. The inlet port 320 is defined by the annular wall 340. The inlet port 320 has a second central axis 322 that is collinear with the first central axis 331. The inlet port 320 is in fluid communication with and extends longitudinally from the internal passage 330. Annular wall 340 is internally threaded at the inlet port 320 to permit, for example, an externally threaded pipe such as the first relief inlet pipe 742 of FIG. 7, to be threadably engaged with the inlet manifold 120.

The first and second outlet ports 310, 312 are defined by and extend through the body 305. The first and second outlet ports 310, 312 are in fluid communication with and extend radially away from the internal passage 330. As shown, first and second outlet ports 310, 312 are longitudinally next to one another along body 305. The first outlet port 310 has a third central axis 313 and second outlet port has a fourth central axis 314. The third and fourth central axes 313, 314 are substantially parallel to one another and substantially perpendicular with first central axis 331. Thus, third and fourth central axes 313, 314 are coplanar with first central axis 331 of internal passage 330.

First outlet port 310 threadably receives the first inlet end 151 of the first PRV 150 and second outlet port 312 threadably receives the second inlet end 156 of second PRV 155. Thus, because the first and second outlet ports 310, 312 are substantially parallel, first and second PRVs 150, 155 are substantially parallel when first and second PRVs 150, 155 are respectively threadably engaged with first and second outlet ports 310, 312, as shown in FIGS. 1 and 2. In operation, fluid (e.g., air, water, oil, liquid nitrogen, etc.) enters the inlet manifold 120 via the inlet port 320, passes through the internal passage 330, and exits the inlet manifold via one or more of the first and second outlet ports 310, 312.

The first union nut 160 of FIGS. 1-2 is shown in more detail in the top view of FIG. 4A and the cross-sectional view of FIG. 4B. It should be understood that first and second union nuts 160, 165 are substantially identical and that features described with respect to first union nut 160 below are preferably also present in second union nut 165. Union nut 160 includes a wall 410 having a hexagonal outer perimeter and an internal shoulder 420. Wall 410 may have an outer perimeter of any shape that allows application of torque to union nut 160 to threadably tighten union nut 160 onto outlet manifold 110, as shown in FIGS. 1 and 2. For example, the outer perimeter of wall 410 may be triangular, square, pentagonal, polygonal, or round with opposing flat portions.

As shown in FIG. 4B, union nut 160 includes a first section 411 and a second section 412. First section 411 has a smaller internal diameter than the second section 412 to define the internal shoulder 420, which engages first adapter 140, as shown in FIG. 2. The second section 412 is internally threaded to threadably engage the union nut 160 with the outlet manifold 110.

In operation, as the second section 412 threadably engages with outlet manifold 110, the internal shoulder 420 catches and slidably rotatably engages with the first adapter 140 to push the first adapter 140 and the first O-ring 170 into the outlet manifold, as shown in FIG. 2.

First adapter 140 is shown in the top view of FIG. 5A and the cross-sectional view of FIG. 5B. It should be understood that the first and second adapters 140, 145 shown herein are preferably substantially identical, and features described with respect to first adapter 140 below are also present in second adapter 145. Adapter 140 includes a body 510 defining a cylindrical fluid passage 530. In operation, fluid passes through adapter 140 via fluid passage 530.

Body 510 further includes a graduated cylindrical external wall 520 having first and second flat portions 541, 542. The first and second flat portions 541, 542 allow torque to be applied to the adapter 140 when threading the adapter 140 into the first outlet end 152. The external wall 520 of body 510 further includes a first section 511, a second section 512, a third section 513, and a fourth section 514. First section 511 is externally threaded to threadably engage with the first outlet end 152, as shown in FIG. 2. Second section 512 has an outer diameter greater than the first section 511 to define a first external shoulder 521. The third section 513 has an outer diameter greater than the second section 512 to define a second external shoulder 522. The fourth section 514 has an outer diameter less than the third section 513 to define a third external shoulder 523. The fourth section 514 also defines a groove 524. In other words, first external shoulder 521 extends radially outwardly from first section 511, second external shoulder 522 extends radially outwardly from second section 512, and the third external shoulder 523 extends radially outwardly from fourth section 514.

Referring to FIGS. 2 and 5B, the third O-ring 190 is more specifically disposed about the first section 511 and on the first external shoulder 521. Thus, when the first and second adapters 140, 145 are threaded into the first and second PRVs 150, 155, the third and fourth O-rings 190, 195 are respectively axially compressed between the first external shoulders 521 and the first and second outlet ends 152, 157. Additionally, first O-ring 170 is more specifically disposed in groove 524. Thus, when the first and second adapters 140, 145 are inserted into the outlet manifold 110, the first and second O-rings 170, 175 are respectively radially compressed between the first and second adapters 140, 145 and the outlet manifold 110.

Looking at FIGS. 2, 4B, and 5B, the internal shoulder 420 of the union nut 160 more specifically engages with the second external shoulder 522 of adapter 140. As union nut 160 is threaded onto to outlet manifold 110, as described above, the internal shoulder 420 catches the second external shoulder 522 to sealingly push adapter 140 and the first O-ring 170 into outlet manifold 110.

FIG. 6 is a cross-sectional view of the outlet manifold 110, which includes a body 605, a first annular extension 610, and a second annular extension 615. The body 605 includes an internal annular wall 640 and an end wall 650. The first and second annular extensions 610, 615 are integrally connected with and extend radially away from body 605. Further, the first and second annular extensions 610, 615 are parallel with one another. The first and second annular extensions 610, 615 are externally threaded. The body 605 and the first annular extension 610 define a first inlet port 611. The body 605 and the second annular extension 615 define a second inlet port 616. The body 605 defines a first fluid port 620 and a second fluid port 680. The annular wall 640 is generally cylindrical and is integrally connected to the end wall 650 to define an internal passage 630.

The internal passage 630 has a first central axis 631. The second fluid port 680 is more specifically defined by the annular wall 640 and has a second central axis 682 which is collinear with the first central axis 631. Second fluid port 680 is in fluid communication with and extends longitudinally from internal passage 630. Annular wall 640 is internally threaded at the second fluid port 680. In some examples, the plug 180 may be threaded into the second fluid port 680, as shown in FIGS. 1 and 2. In some examples, an externally threaded pipe, such as the second relief outlet pipe 746 of FIG. 7, may be threadably engaged with second fluid port 680. It should be understood that fluid may flow into or out of the internal passage 630 via the second fluid port 680. Thus, the second fluid port 680 may be used as either an inlet port or an outlet port.

The first fluid port 620 is in fluid communication with and extends radially away from the internal passage 630. In other words, first fluid port 620 passes through annular wall 640 of body 605. The first fluid port 620 has a third central axis 623. Further, the body 605 is internally threaded at the first fluid port 620. In some examples, the plug 180 may be threaded into the first fluid port 620. In some examples, an externally threaded pipe such as the first relief outlet pipe 744 of FIG. 7, may be threadably engaged with the first outlet port 620. It should be understood that fluid may flow into or out of the internal passage 630 via the first fluid port 620. Thus, the first fluid port 620 may be used as either an inlet port or an outlet port.

The first inlet port 611 is defined by body 605 and first annular extension 610. The second inlet port 616 is defined by body 605 and second annular extension 615. The first and second inlet ports 611, 616 are in fluid communication with and extend radially away from the internal passage 630. The first and second inlet ports 611, 616 are longitudinally next to one another along the body 605. In other words, the first and second inlet ports 611, 616 extend radially away from the internal passage 630 in the same direction. In some examples, the first and second inlet ports 611, 616 are radially opposite the first outlet port 620. The first inlet port 611 has a fourth central axis 614. The second inlet port 616 has a fifth central axis 617.

As shown in the example of FIG. 6, the third, fourth, and fifth central axes 623, 614, 617 are substantially parallel. Further, the third, fourth, and fifth central axes 623, 614, 617 are each substantially perpendicular with the first central axis 631. As shown in FIGS. 1 and 6, the first, fourth, and fifth central axes 623, 614, 617 are coplanar with one another. Further, as shown in FIGS. 1 and 6, the third central axis 623 is coplanar with the first central axis 631. In some examples, the third, fourth, and fifth central axes 623, 614, 617 are coplanar with one another.

In operation, fluid (e.g., air, water, oil, liquid nitrogen, etc.) enters the outlet manifold 110 via the first and/or second inlet ports 611, 616, passes through the internal passage 630, and exits the inlet manifold via the first and/or second fluid ports 620, 680.

Referring to FIGS. 1, 2, 4B, 5B, and 6, the first inlet port 611 slidingly receives and sealingly engages with the first adapter 140 via the first O-ring 170. In other words, first adapter 140 has a slip fit and radial seal with first inlet port 611 via first O-ring 170. The first annular extension 610 threadably engages with second section 412 of first union nut 160 to retain first adapter 140 in the first inlet port 611. As illustrated in FIG. 2, a tolerance gap 142 is formed between a shoulder of the first adapter 140 (e.g., the third external shoulder 523 of FIG. 5) and an end of the outer manifold 110 (e.g., an outer end 612 of the first annular extension 610 of FIG. 6), and a tolerance gap 147 is formed between a shoulder of the second adapter 145 (e.g., the third external shoulder 523 of FIG. 5) and an end of the outer manifold 110 (e.g., an outer end 618 of the second annular extension 615 of FIG. 6). The first annular extension 610 abuts the third external shoulder 523 when the tolerance gap 142 has been depleted to axially stop the first adapter 140 from being too deeply inserted in the first inlet port 611. Further, the second inlet port 616 slidingly receives and sealingly engages with the second adapter 145 via the second O-ring 175. Thus, second adapter 145 has a slip fit and radial seal with second inlet port 616 via second O-ring 175. The second annular extension 615 threadably engages with the second section of second union nut 165 to retain the second adapter 145 in the second inlet port 616. The second annular extension 615 abuts the third external shoulder 523 when the tolerance gap 147 has been depleted to axially stop the second adapter 145 from being too deeply inserted in the second inlet port 616. Thus, outlet manifold 110 is in selective fluid communication with the inlet manifold 120 via the first PRV 150 and the first adapter 140 and via the second PRV 155 and the second adapter 145.

Figure 7:
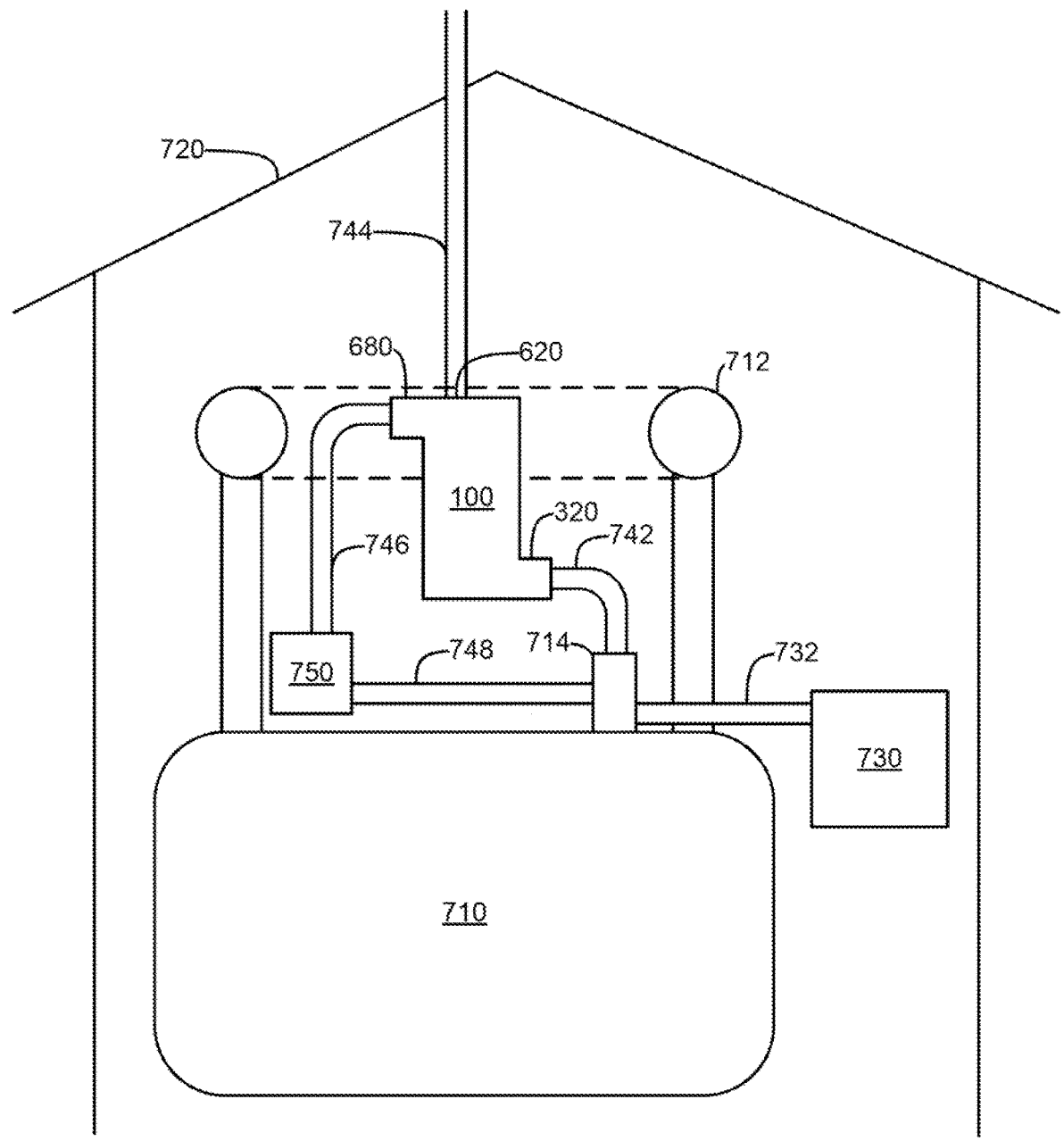
FIG. 7 is a schematic drawing of the valve assembly connected to a tank.

Valve assembly 100 provides flow redundancy between inlet port 320 and the first and/or second fluid ports 620, 680 via first and second PRVs 150, 155. Further, it should be appreciated that the features described herein permit a compact geometry of valve assembly 100. By configuring inlet and outlet manifolds 120, 110 to connect with first and second PRVs 150, 155 in a parallel arrangement, valve assembly 100 provides a low-profile paired relief valve. In other words, by orienting the off-the-shelf PRVs 150, 155 to be parallel with one another via the inlet manifold 120 and capturing their respective outlet ends 152, 157 via the adapters 140, 145 and the outlet manifold 110, crude piping and fittings between a pressure tank 710 and the PRVs 150, 155 are eliminated and pressure relief fluid routing is simplified, as shown in FIG. 7.

It should be understood that the inlet and outlet manifolds 120, 110 may be configured to have any number of corresponding outlet and inlet port sets besides the first and second outlet ports 310, 312 and the first and second inlet ports 611, 616 shown in the examples of FIGS. 1-6. Further, it should be understood that the valve assembly 100 includes any corresponding number of adapters, union nuts, and O-rings to accompany each corresponding outlet and inlet port set besides the adapters 140, 145, union nuts 160, 165, and O-rings 190, 195, 170, 175 shown in the examples of FIGS. 1-6. In other words, the inlet and outlet manifolds 120, 110 may be configured to share n sets of corresponding inlet and outlet ports to support n parallel PRVs via n adapters, n union nuts, and 2n O-rings.

In operation, fluid enters the inlet manifold 120 via inlet port 320. If a pressure of the fluid exceeds a predetermined pressure threshold (e.g., 100 pounds per square inch (PSI), 7 atmospheres, 690 kilopascals, etc.) the first and/or second PRV 150, 155 opens to allow the over-pressurized fluid to flow through the open first and/or second PRV 150, 155, the respective first and/or second adapter 140, 145, and into the outlet manifold 110. From the outlet manifold 110, the over-pressurized fluid exhausts via the first and/or second fluid ports 620, 680. For example, released fluid may exhaust to the atmosphere via pipe(s) threaded into the first and/or second outlet ports, such as the first relief outlet pipe 744 of FIG. 7.

The compact geometry of the valve assembly 100 is formed by connecting the threaded, off-the-shelf PRVs 150, 155 in a parallel arrangement. To assemble the valve assembly 100 in such a manner, a user is to thread the first and second inlet ends 151, 156 of the first and second PRVs 150, 155 to the respective first and second outlet ports 310, 312 of the inlet manifold 120. The user also is to slide the first and second union nuts 160, 165 over the first and second outlet ends 152, 157 of the respective first and second PRVs 150, 155. The user also is to place the third and fourth O-rings 190, 195 about the first section 511 and on the first external shoulder 521 of the respective first and second adapters 140, 145. Next, the user is to threadably connect the first and second adapters 140, 145 to the first and second outlet ends 152, 157 of the respective first and second PRVs 150, 155 such that the third and fourth O-rings 190, 195 are disposed between the first and second PRVs 150, 155 and the first external shoulder 521 of the respective first and second adapters 140, 145. The user also is to dispose the first and second O-rings 170, 175 in the groove 524 of the respective first and second adapters 140, 145. Next, the user is to insert the first and second adapters 140, 145 and the respective first and second O-rings 170, 175 into the first and second inlet ports 611, 616 of the outlet manifold 110. Subsequently, the user is to thread the first and second union nuts 160, 165 to the respective first and second annular extensions 610, 615 to secure the first and second adapters 140, 145 to the outlet manifold 110.

To perform maintenance on valve assembly 100 and/or to replace one or more of the first and second PRVs 150, 155, a user is to at least partially disassemble valve assembly 100 by unthreading the first and second union nuts 160, 165 respectively from the first and second annular extensions 610, 615. Further, the user is to then pull the outlet manifold 110 away from the first and second PRVs 150, 155 to extract the first and second adapters 140, 145 and the first and second O-rings 170, 175 respectively from the first and second inlet ports 611, 616 of the outlet manifold 110. Then, the user is to unthread the first and second inlet ends 151, 156 respectively from the first and second outlet ports 310, 312 of the inlet manifold 120 to free the first and second PRVs 150, 155 from the inlet manifold 120. Next, the user is to unthread the first and second adapters 140, 145 respectively from the first and second PRVs 150, 155. Further, the user is to replace the O-rings 170, 175, 190, 195 and thread the first and second adapters 140, 145 into new first and second PRVs to reassemble the valve assembly 100.

FIG. 7 is a schematic drawing of the valve assembly 100 connected to a tank 710 in a fluid system 700. In the illustrated example of FIG. 7, a structure 720 houses the tank 710, the valve assembly 100, and a fluid-driven apparatus 730 (e.g., a beverage dispenser, a cryogenic cooler, etc.) and a secondary relief device 750. The tank 710 includes an outlet fitting 714 to release fluid from the tank 710. The fluid-driven apparatus 730 is in fluid communication with the tank 710 via a supply pipe 732 and the outlet fitting 714. The tank 710 is in fluid communication with the valve assembly 100 via the outlet fitting 714 and a first relief inlet pipe 742. The tank 710 is in fluid communication with the secondary relief device 750 via the outlet fitting 714 and a second relief inlet pipe 748. The valve assembly 100 is in fluid communication with the atmosphere via a first relief outlet pipe 744. The secondary relief device 750 is in fluid communication with the valve assembly 100 via a second relief outlet pipe 746. The tank 710 includes a protective guard rail 712. In some examples, the guard rail 712 is generally circular, as indicated by the phantom lines in FIG. 7. In the example of FIG. 7, the outlet fitting 714, the first relief inlet pipe 742, the secondary relief device 750, the second relief inlet pipe 748, the second relief outlet pipe 746, and the valve assembly 100 are disposed within a volume defined by the guard rail 712. Thus, the outlet fitting 714, the first relief inlet pipe 742, the secondary relief device 750, the second relief inlet pipe 748, the second relief outlet pipe 746, and the valve assembly 100 are substantially protected from collisions with other objects by the guard rail 712. It should be appreciated that the compact geometry of the valve assembly 100 permits the valve assembly 100 to be located within the confines of the guard rail 712.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may aid in simplifying maintenance of PRVs on pressurized tanks. More specifically, by providing removable threaded connections to PRVs, soldered and/or hard plumbing connections to the PRVs need not be broken. Thus, replacement time and associated costs are reduced while maintaining robust plumbing connections related to pressurized tanks. Further, the compact pressure relief assembly provided by the disclosed apparatus may better fit into pressurized tank storage areas and/or within protective features of pressurized tanks (e.g., safety rails, covers, cages, etc.) to mitigate potential damage of the pressure relief assembly. Additionally, when constructed of ductile materials (e.g., brass, stainless steel, etc.), the above disclosed apparatus may aid pressurized tank system designers in meeting design requirements related to material brittleness in cryogenic applications (e.g., liquid nitrogen, refrigerated carbon dioxide, etc.).

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A compact pressure relief valve assembly for providing flow redundancy, comprising:
    an inlet manifold defining a pair of outlet ports, wherein the pair of outlet ports are parallel to each other, and wherein each of the pair of outlet ports is configured to threadably receive an inlet end of a respective one of a pair of pressure relief valves;
    a pair of adapters, each of which has a first end, a second end, and an external shoulder located between the first end and the second end, wherein the first end of each of the pair of adapters is configured to threadably engage with an interior surface of an outlet end of a respective one of the pair of pressure relief valves;
    an outlet manifold defining a pair of inlet ports, each of which is configured to slidably receive the second end of a respective one of the pair of adapters; and
    a pair of connectors, each of which includes an internal shoulder at a first connector end and threads at an opposing second connector end, wherein the internal shoulder of each of the pair of connectors is configured to engage a respective one of the pair of adapters as the threads of the respective one of the pair of connectors engage the outlet manifold to push the second end of the respective one of the pair of adapters into a respective one of the pair of inlet ports with a tolerance gap formed between the external shoulder and the outlet manifold.

2. The compact pressure relief valve assembly of claim 1, wherein the inlet manifold includes second threads adjacent each of the pair of outlet ports for threadably receiving a respective one of the pair of pressure relief valves.

3. The compact pressure relief valve assembly of claim 1, wherein each of the pair of connectors is a union nut configured to slidably retain a respective one of the pair of adapters in a respective one of the pair of inlet ports of the outlet manifold.

4. The compact pressure relief valve assembly of claim 1, wherein the outlet manifold includes a pair of external threads, each of which is configured to threadably engage the threads of a respective one of the pair of connectors for threadably coupling the pair of connectors to the outlet manifold.

5. The compact pressure relief valve assembly of claim 1, wherein the outlet manifold includes a pair of annular extensions, each of which defines a respective one of the pair of inlet ports.

6. The compact pressure relief valve assembly of claim 5, wherein each of the pair of annular extensions includes external threads configured to threadably engage the threads of a respective one of the pair of connectors.

7. The compact pressure relief valve assembly of claim 5, wherein each tolerance gap is formed between the external shoulder of the respective one of the pair of adapters and an outer end of a respective one of the pair of annular extensions of the outlet manifold.

8. The compact pressure relief valve assembly of claim 1, further comprising a first pair of O-rings, each of which is configured to be compressed between a respective one of the pair of adapters and the outlet manifold.

9. The compact pressure relief valve assembly of claim 8, further comprising a second pair of O-rings, each of which is configured to be compressed between a respective one of the pair of adapters and a respective one of the pair of pressure relief valves.

10. The compact pressure relief valve assembly of claim 1, wherein each of the pair of adapters further defines a groove adjacent the second end.

11. The compact pressure relief valve assembly of claim 10, further comprising a pair of O-rings, each of which is configured to be disposed in the groove of a respective one of the pair of adapters.

12. A method for assembling a compact pressure relief valve assembly that provides flow redundancy, comprising:
threadably inserting an inlet end of each of a pair of pressure relief valves into a respective one of a pair of outlet ports of an inlet manifold, wherein the pair of outlet ports are parallel to each other such that the pair of pressure relief valves are parallel to each other when threaded to the inlet manifold;
sliding each of a pair of connectors over an outlet end of a respective one of the pair of pressure relief valves, wherein each of the pair of connectors includes an internal shoulder at a first connector end and threads at an opposing second connector end;
threadably connecting a first end of each of a pair of adapters to the outlet end of a respective one of the pair of pressure relief valves;
slidably inserting a second end of each of the pair of adapters into a respective one of a pair of inlet ports of an outlet manifold; and
threadably connecting each of the pair of connectors to the outlet manifold so that the internal shoulder of each of the pair of connectors engages a respective one of the pair of adapters and pushes the second end of the respective one of the pair of adapters further into the respective one of the pair of inlet ports of the outlet manifold.

13. The method of claim 12, further comprising, prior to threadably connecting the first end of each of the pair of adapters to the outlet end of the respective one of the pair of pressure relief valves, placing each of a first pair of O-rings about the first end and on an external shoulder of a respective one of the pair of adapters.

14. The method of claim 13, wherein the first end of each of the pair of adapters is threadably connected to the outlet end of the respective one of the pair of pressure relief valves such that each of the first pair of O-rings is disposed between the external shoulder of the respective one of the pair of adapters and the respective one of the pair of pressure relief valves.

15. The method of claim 12, further comprising, prior to slidably inserting the second end of each of the pair of adapters into a respective one of the pair of inlet ports, disposing each of a second pair of O-rings in a groove defined by a respective one of the pair of adapters.

16. The method of claim 15, wherein the second end of each of the pair of adapters is slidably inserted into the respective one of the pair of inlet ports such that a respective one of the second pair of O-rings is inserted into the respective one of the pair of inlet ports.

17. The method of claim 12, further comprising disassembling and replacing a pair of O-rings of the compact pressure relief valve assembly.

18. The method of claim 17, wherein disassembling the compact pressure relief valve assembly comprises:
unthreading each of the pair of connectors from the outlet manifold;
pulling the outlet manifold away from the pair of pressure relief valves; and
extracting each of the pair of adapters from the respective one of the pair of inlet ports of the outlet manifold.

19. The method of claim 18, wherein disassembling the compact pressure relief valve assembly further comprises extracting a respective one of the pair of O-rings upon pulling the outlet manifold away from the pair of pressure relief valves.

20. The method of claim 18, wherein disassembling the compact pressure relief valve assembly further comprises:
unthreading the inlet end of each of the pair of pressure relief valves from the respective one of the pair of outlet ports of the inlet manifold to free the pair of pressure relief valves from the inlet manifold; and
unthreading each of the pair of adapters from the respective one of the pair of pressure relief valves.

* * * * *